(12) United States Patent
Ferreira De Araujo et al.

(10) Patent No.: US 11,807,213 B2
(45) Date of Patent: Nov. 7, 2023

(54) METHOD FOR MANAGING THE STATE OF CHARGE OF A HYBRID VEHICLE

(71) Applicant: RENAULT s.a.s., Boulogne Billancourt (FR)

(72) Inventors: Manoela Ferreira De Araujo, Cachan (FR); Ahmed Ketfi-Cherif, Elancourt (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 16/643,231

(22) PCT Filed: Aug. 21, 2018

(86) PCT No.: PCT/EP2018/072524
§ 371 (c)(1),
(2) Date: Feb. 28, 2020

(87) PCT Pub. No.: WO2019/042818
PCT Pub. Date: Mar. 7, 2019

(65) Prior Publication Data
US 2020/0331452 A1    Oct. 22, 2020

(30) Foreign Application Priority Data
Aug. 30, 2017    (FR) ...................................... 1757995

(51) Int. Cl.
*B60W 20/13*    (2016.01)
*G01C 21/34*    (2006.01)

(52) U.S. Cl.
CPC .......... *B60W 20/13* (2016.01); *G01C 21/3469* (2013.01); *B60W 2510/244* (2013.01); *B60W 2510/246* (2013.01); *B60W 2555/20* (2020.02)

(58) Field of Classification Search
None
See application file for complete search history.

(56) References Cited

U.S. PATENT DOCUMENTS

2010/0280687 A1* 11/2010 Tate, Jr. ................. B60W 10/26
   903/903
2013/0245874 A1*  9/2013 Magnet ................. B60W 10/08
   903/903
(Continued)

FOREIGN PATENT DOCUMENTS

DE    10 2012 204 410 A1    9/2013
JP          11-355967 A       12/1999
(Continued)

OTHER PUBLICATIONS

International Search Report dated Oct. 1, 2018 in PCT/EP2018/072524 filed Aug. 21, 2018, 3 pages.
(Continued)

*Primary Examiner* — Shardul D Patel
*Assistant Examiner* — Chase L Cooley
(74) *Attorney, Agent, or Firm* — Oblon, McClelland, Maier & Neustadt, L.L.P.

(57) ABSTRACT

The state of charge of a traction battery of a hybrid vehicle power train is managed by, during a phase of running of the vehicle to a current destination, predicting a temperature that a battery will reach, after the power train is switched off, at a time of departure to a future destination; estimating, as a function of the battery temperature previously predicted, a minimum state of charge of the battery making it possible to provide, during a phase of running to the future destination, a predefined minimum power level; and maintaining the state of charge of the battery close to the minimum state of charge.

12 Claims, 2 Drawing Sheets

(56) References Cited

U.S. PATENT DOCUMENTS

| | | | |
|---|---|---|---|
| 2014/0012450 A1* | 1/2014 | Laing | B60W 30/18027 |
| | | | 701/22 |
| 2015/0100188 A1* | 4/2015 | Wagner | B60L 58/24 |
| | | | 903/903 |
| 2017/0222448 A1* | 8/2017 | MirTabatabaei | G01R 31/367 |

FOREIGN PATENT DOCUMENTS

| | | |
|---|---|---|
| JP | 2007-104799 A | 4/2007 |
| WO | WO 2012/076928 A1 | 6/2012 |

OTHER PUBLICATIONS

French Preliminary Search Report dated Jun. 12, 2018 in Patent Application No. 1757995 filed Aug. 30, 2017, 2 pages.

\* cited by examiner

METHOD FOR MANAGING THE STATE OF CHARGE OF A HYBRID VEHICLE

BACKGROUND

The present invention relates to a method for managing the state of charge of a traction battery of a vehicle provided with a hybrid power train comprising a heat engine and an electric engine.

In the current context of consensus on climate change, reducing carbon dioxide ($CO_2$) emissions is a major challenge confronting vehicle constructors, with the relevant standards being evermore demanding.

In addition to constantly improving the efficiencies of conventional heat engines, which is accompanied by a lowering of the $CO_2$ emissions, electric vehicles ("EV", in which the power train comprises only an electric engine) and hybrid-electric vehicles ("HEV" in which the power train comprises an electric engine and a heat engine) are these days considered to be the most promising solution for reducing $CO_2$ emissions.

Various electric energy storage technologies have been tested in recent years in order to meet the needs of the EVs and HEVs. It now seems to be that the batteries with lithium-ion (Li-ion) cells are those likely to provide the best trade-off between power density, which favors performance in terms of acceleration in particular, and energy density, which favors distance. However, the use of this Li-ion technology to form traction batteries is not without difficulties, notably in view of the necessary voltage levels, of the order of 400 volts (V), or even in view of the high temperature levels generated in the battery during both charging and discharging cycles.

Currently, one of the factors slowing down the growth of the electrical and hybrid vehicle market remains cost, which remains higher than that of the conventional heat-powered vehicles, notably because of the Li-ion traction battery. Thus to convince potential clients to switch to an EV or an HEV, it seems essential to develop the latter with technologies with cost contained. That is one problem that the present invention proposes to resolve.

In order to contain the costs, the applicant has therefore developed and refined a particular hybrid power train architecture. As in any conventional hybrid architecture, an electric engine powered by a Li-ion battery assists a heat engine, the two being capable of transmitting, alternately or simultaneously, torque to the drive wheels of the vehicle. However, a particular feature of this architecture, applying in particular to its torque transmission system, is that vehicle takeoff can be performed only by purely electric torque. In other words, switching the vehicle from a zero speed to a non-zero speed can be ensured only by transmission of electric torque, no thermal torque can be transmitted at the same time at the time of takeoff. This is a consequence of the controlled cost solutions implemented in the transmission system. Likewise, the maintaining of the vehicle at very low speed can be ensured only by transmission of electric torque, until a speed threshold is exceeded, from which thermal torque can be transmitted at the same time to the wheels. One drawback with this type of architecture is that, if the state of charge of the battery (or SOC) passes below a certain threshold making it possible to supply the minimum power level for vehicle takeoff, then it is temporarily necessary to immobilize the vehicle in order to recharge it through the use of the heat engine in generator set mode. However, keeping the SOC above a certain threshold, and above all choosing the value of this threshold, is not without many difficulties given the multiple possible usage cases. That again is a problem that the present invention proposes to resolve.

To illustrate these difficulties, the following usage case can be considered: a driver sets off from a plain region to go skiing in the mountains. After several hundreds of kilometers on a highway, he or she arrives in the valley hollow to climb to the resort with an SOC close to a minimum value authorized by the energy management law implemented in the central vehicle computer (or EVC, for "electric vehicle controller"). The battery of the vehicle has first of all undergone a so-called "charge-depleting" phase during which the charge has been depleted to a minimum threshold SOC, by maximizing the use of the electric engine. Then, the vehicle has undergone a so-called "charge-sustaining" phase, during which the SOC has been kept in the vicinity of this minimum threshold, by alternating phases of running in electric mode with regenerative braking phases, or even with phases of recharging through the use of the heat engine to have the electric engine run in generator mode. Despite the low SOC at the valley bottom, the driver manages to climb to the resort because the battery is hot, of the order of 40° Celsius after a long highway run. By virtue of its high temperature, it remains powerful despite its low SOC. The strategy of SOC preservation has therefore worked well, initially in all cases. Having arrived at the resort, he or she leaves his or her car parked in an outside carpark throughout his or her stay, for example for a week. After a week, the temperature of the battery has dropped to the local ambient temperature, i.e. −10° Celsius, for example. The SOC, which was sufficient to ensure a certain level of performance at 40° Celsius, is no longer sufficient at −10° Celsius: the driver has little chance of his or her vehicle being able to immediately take off from the carpark when leaving the resort to go back home, and he or she must first raise the SOC through the use of the heat engine to have the electric engine run in generator mode. The strategy of preservation of the SOC has therefore ultimately failed, because of the unsuitability of the SOC to the temperature. That again is a problem that the present invention proposes to resolve.

In order to avoid this type of situation in which the SOC of the battery is unsuited to its temperature, a preventive strategy is known from U.S. Pat. No. 8,330,424B2 which uses the navigation information to know the temperature at the place of destination and regulate the SOC accordingly, by keeping it within a suitable range. However, in the case of previous usage which includes a prolonged phase of non-use of the vehicle during which the temperature conditions change greatly, this solution is inoperative and leaves the vehicle immobilized in the carpark. That again is a problem that the present invention proposes to resolve.

BRIEF SUMMARY

The aim of the present invention is notably to remedy the drawbacks and difficulties mentioned above by determining a target minimum SOC to observe the performance requirements, whether it be take-off or any other service provided, not only during the current run, but also during the next run. In the case of previous use for example, it thus proposes preventively raising the SOC after the outbound trip in anticipation of the temperature drop at the end of the stay. To this end, the subject of the invention is a method for managing the state of charge of a traction battery of a hybrid vehicle power train. This method comprises, during a phase of running of the vehicle to a current destination:

a step of prediction of the temperature that the battery will reach, after the power train is switched off, at a time of departure to a future destination;

a step of estimation, as a function of the battery temperature previously predicted, of a minimum state of charge of the battery making it possible to provide, during a phase of running to the future destination, a predefined minimum power level;

a step of maintaining of the state of charge of the battery close to the minimum state of charge.

In a preferential embodiment, the step of prediction of the temperature that the battery will reach can include among its parameters:

an elapsed time between the end of the current run and the start of the future run, and/or;

a model of variation of the ambient temperature between the end of the current run and the start of the future run, and/or;

a model of thermal inertia of the battery giving the trend of the temperature of the battery as a function of the trend of the ambient temperature.

Advantageously, the elapsed time between the end of the current run and the start of the future run can be:

obtained directly from a run scheduling system, or;

deduced statistically from previous runs obtained from a run memorizing system, said previous runs exhibiting similarities with the current run, or;

equal to a constant.

Also advantageously, the location of the vehicle being able to be known from a geolocation system and a measured minimum temperature at said location being able to be known from a meteorological information broadcasting system, the model of variation of the ambient temperature can be defined such that:

the variation is nil when the measured ambient temperature is below the minimum temperature;

the variation is equal to a negative constant when the measured ambient temperature is above a predefined value greater than the minimum temperature;

the variation trends linearly between the minimum temperature and the predefined value.

Advantageously again, the model of thermal inertia of the battery can be defined such that the temperature of the battery varies identically with the ambient temperature.

In a preferential embodiment, the step of estimation of the minimum state of charge can include selecting the maximum value from among a plurality of state-of-charge values, said plurality being able to include at least:

a minimum state-of-charge value to reach the current destination, estimated as a function of the measured current temperature of the battery and;

a minimum state-of-charge value to reach the future destination, estimated as a function of the temperature previously predicted.

Advantageously, the plurality of state-of-charge values can also include a minimum state of charge to ensure a predefined life of the battery.

Advantageously also, the minimum state-of-charge values to reach the current destination and to reach the future destination can be calculated in real time by a method of linear modeling of the trend of the available power in the battery as a function of the state of charge of the battery.

For example, the linear modeling method can be a recursive least squares method. Advantageously, on each new estimation of a state-of-charge value obtained recursively from the preceding estimation, said preceding estimation can then be multiplied by an omission factor $\lambda<1$.

Also a subject of the present invention is a computer comprising hardware and software means implementing such a method, notably of the "battery management system" (BMS) type.

A final subject of the present invention is a hybrid vehicle comprising such a computer.

BRIEF DESCRIPTION OF THE DRAWINGS

Other features and advantages of the invention will emerge from the following description given in light of the attached FIGS. 1, 2, 3 and 4 and which illustrate, through graphs, an exemplary embodiment of the invention.

DETAILED DESCRIPTION

To clearly understand the principles of the invention explained hereinbelow, it is essential to keep in mind that the available power in discharge mode at the terminals of a battery, called Pbat hereinbelow, depends:

on its SOC: the more discharged the battery is, the less it can supply power, and vice versa;

on its temperature: the colder the battery is, the less it can supply power;

on its state of aging, which impacts the total capacity of the battery: the older the battery is, the less it can supply power.

In practice to keep a certain required minimum power level available, it is therefore essential to ensure that the battery always has a minimum SOC which depends, among other parameters, on the temperature of the battery. This is one of the roles of the energy management law implemented on the EVC, which tries to maintain a target battery state of charge, either through regenerative braking, or by virtue of the heat engine which drives the electric engine operating in generator mode.

Hereinafter in the present application, it is described how, as a function of the internal temperature of the battery ("battery temperature" or Tbat hereinbelow) and as a function of the temperature of the outside air ("ambient temperature" or Tamb hereinbelow), it is possible to determine, according to the invention, the target minimum SOC to observe the performance requirements, whether it be the vehicle takeoff or any other service provided, and not only during the current run, but also during the next run.

For the current run, it is possible to use the temperature of the battery known in real time as the basis in order to calculate a target SOC level, called SOC_current_target hereinbelow.

For the next run, it is possible to use the prediction of the future battery temperature, as a function of the ambient temperature known in real time, as a basis in order to calculate a target SOC level, called SOC_future_target hereinbelow.

The final target SOC is the maximum between SOC_current_target, SOC_future_target and a minimum target SOC independent of temperature, for example the minimum SOC sustained by the "charge sustaining" function.

Prediction of the Battery Temperature

The prediction of the future battery temperature depends:

1. on the thermal inertia of the battery and on the elapsed time between the current run and the future run;

2. on the variation of ambient temperature between the current run and the future run.

These items of information can be known in advance, for example if the future run is programmed and if access to weather information is possible. When that is not the case, it is also possible to make predictions based on the weather statistics of the region, the statistics on downtimes between two runs and the identification of the thermal inertia of the battery.

Figure 1:
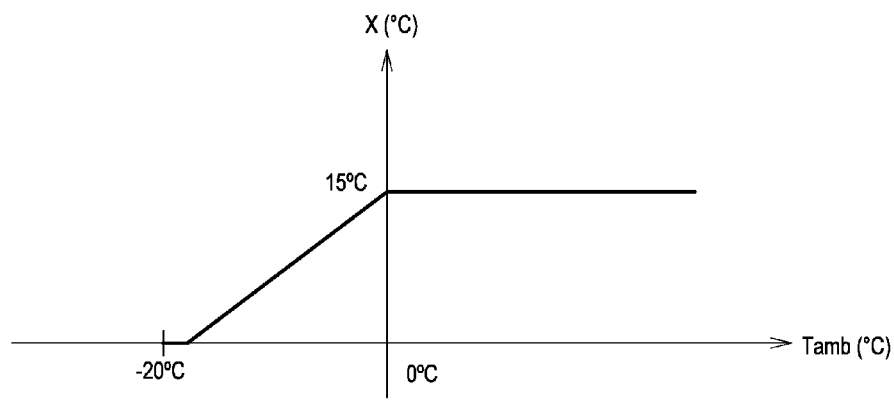

FIG. 1 illustrates by a graph an example of ambient temperature (X) drop values that can be used for the predictive calculation of the future temperature of the battery. In order to avoid power degradations, the prediction of the ambient temperature can be gauged rather pessimistically, for example by taking a drop of Tamb of 15° C. as constant for the positive Tambs. When Tamb reaches its minimum, for example approximately −20° C. in Paris, it is considered that Tamb will not be able to go below, and the Tamb drop is therefore taken to be equal to 0. A linear interpolation between Tamb=0° C. and Tamb=−20° C. approx. is an example of variation of Tamb for the predictive calculation according to the invention in Paris.

Figure 2:
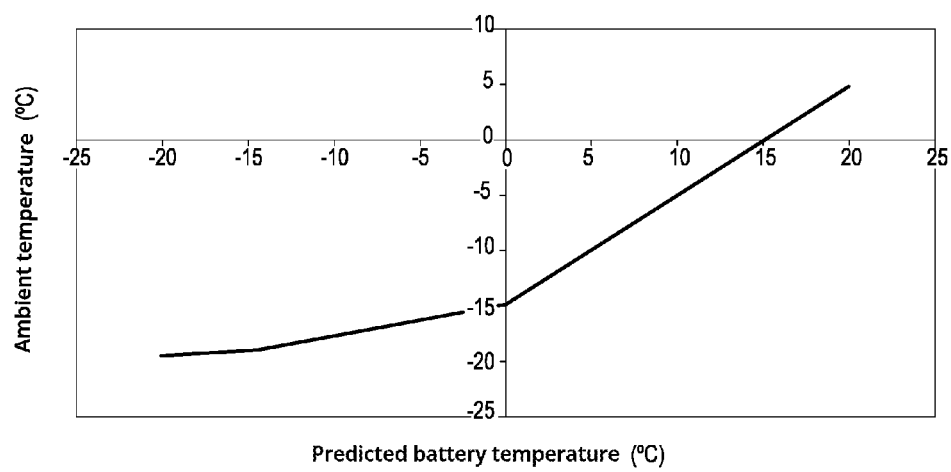

Thus, if considering an elapsed time between the current run and the next run that is long enough for the temperature of the battery to have the time to converge toward predicted Tamb, the graph of FIG. 2 illustrates, from the drop of Tamb of FIG. 1, the prediction of future Tbat as a function of current Tamb.

Estimation of the Current Target SOC

The invention exploits the link between the SOC of the battery and the maximum available power in the battery: when the SOC increases, the maximum available power increases also and vice versa. This link can, for example, be characterized in tables giving the maximum available power of the battery as a function of its temperature and of its state of charge, or by another algorithm implemented in the battery computer.

One principle of the present exemplary embodiment is to identify this link in real time by a linear modeling, of the type, for example, of the recursive least squares method. Indeed, the linear modeling is coherent if limited to a restricted zone of SOC level. When the battery has a fairly high capacity (which is the case for most hybrid vehicles), the SOC variations are fairly slow to allow a sufficient number of samples making it possible to clearly identify the linear link over the restricted zone. In the present exemplary embodiment, the recursive least squares method can be written as follows, in which a and b denote the real linearization coefficients and t denotes time:

$$P\text{bat}(t) = a(t) * SOC(t) + b(t)$$

Another principle of the present exemplary embodiment is to reduce the weight of the old measurements in favor of the more recent ones, according to an exponential law. For that, on each step of the recurrence, the weight of the old measurements is multiplied by an omission factor $\lambda < 1$, thus, at the (n+1)th step:
the first estimation is weighted by $\lambda^n$
the second estimation is weighted by $\lambda^{n-1}$
the nth estimation is weighted by $\lambda$
the new estimation is weighted by 1
Take:

$$\theta(t) = \theta(t-1) + L(t) \times [y(t) - \varphi^T(t) \times \theta(t-1)]$$

$$L(t) = \frac{P(t-1) \times \varphi(t)}{\lambda(t) + \varphi^T(t) \times P(t-1) \times \varphi(t)}$$

$$P(t) = \frac{1}{\lambda(t)} \times \left[ P(t-1) - \frac{P(t-1)\varphi(t) \times \varphi^T(t) \times P(t-1)}{\lambda(t) + \varphi^T(t) \times P(t-1) \times \varphi(t)} \right]$$

in which:
P=covariance matrix (2×2)
θ=vector of the parameters (2×1)
φ=control vector (2×1)
and:

$$\varphi(t) = \begin{bmatrix} SOC(t) \\ 1 \end{bmatrix}$$

$$\theta(t) = \begin{bmatrix} a(t) \\ b(t) \end{bmatrix}$$

$$y(t) = P\text{bat}(t)$$

The advantages of the use of such a method are multiple, but, among others, one that can be cited is the fact that identifying the real time link makes it possible to be robust to temperature variations or even to the aging of the battery. It is also possible to cite the fact that the omission factor makes it possible to adjust the "filtering" of the learning to render it more or less dynamic.

In order to increase the robustness of the method, it may possibly be advantageous to add optional enhancements to it, such as discarding the samples in which the variations of SOC and/or of Pbat are too great. They may be measurement noises or undesirable disturbances, or they may even concern charge/discharge peaks during which the battery is too "excited" and its voltage (which is the image of the maximum available Pbat) increases on a spot basis.

It is also possible to envisage discarding the samples in which the variations of SOC and of Pbat are of opposite signs, for example measurement noises or transient errors.

It is also possible to envisage discarding the samples in which the variations of SOC and of Pbat are too small, in order to avoid "saturating" linearization with duplicated samples, in the case where the vehicle remains stopped with a low consumption of the auxiliaries for example.

It is also possible to envisage adding a delay in the initialization of the linearization method before taking it into account, in order to ensure a sufficient number of samples (and, during this time, it is possible to use a default value for the target SOC for example).

It is finally possible to envisage saturating the coefficients of the identified straight line, in order to ensure a minimum slope for varying the SOC, to cover the case in which, from startup, if the vehicle remains stopped for a long time with low consumption of the auxiliaries, the initialization delay would not be sufficient.

Figure 3:
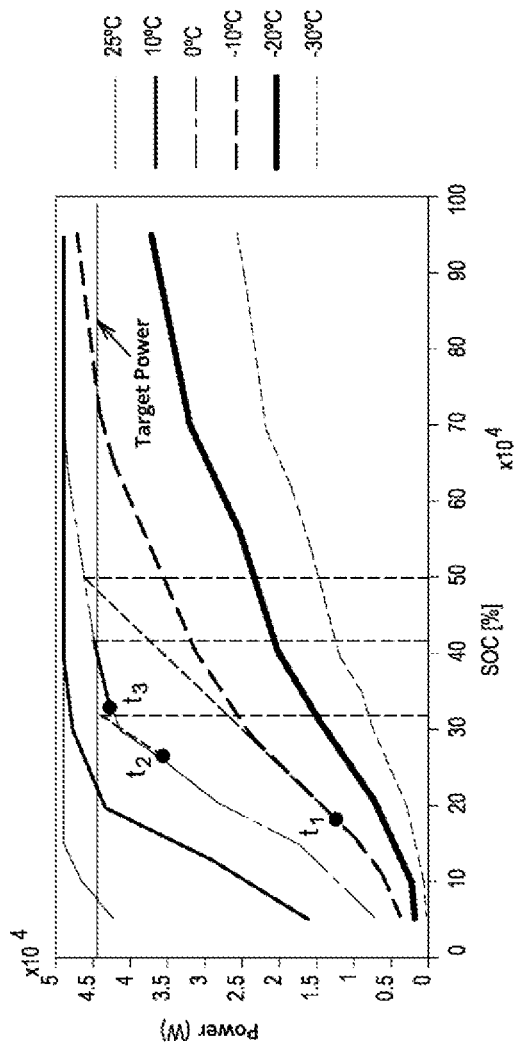

FIG. 3 illustrates the convergence of the calculation of SOC_target, by targeting a minimum available battery power of 45 kW:
at an instant t1:
SOC=19%
Tbat=−10° C.
Pbat=12 kW
SOC_current_target=50%
at an instant t2:
SOC=26%
Tbat=0° C.
Pbat=35 kW
SOC_current_target=31% at an instant t3:
SOC=31%
Tbat=0° C.
Pbat=42 kW
SOC_current_target=41%

It can be seen in the example of FIG. 3 that, by virtue of the local linearization and the monotonic link between Pbat and SOC, the target SOCs calculated cause the current SOC to rise to converge toward the SOC corresponding to target Pbat. It can also be seen that the calculation adapts also to battery temperature changes (i.e. initial Tbat=Tamb=−10° C.; final Tbat=0° C.).

Estimation of the Future Target SOC

Figure 4:
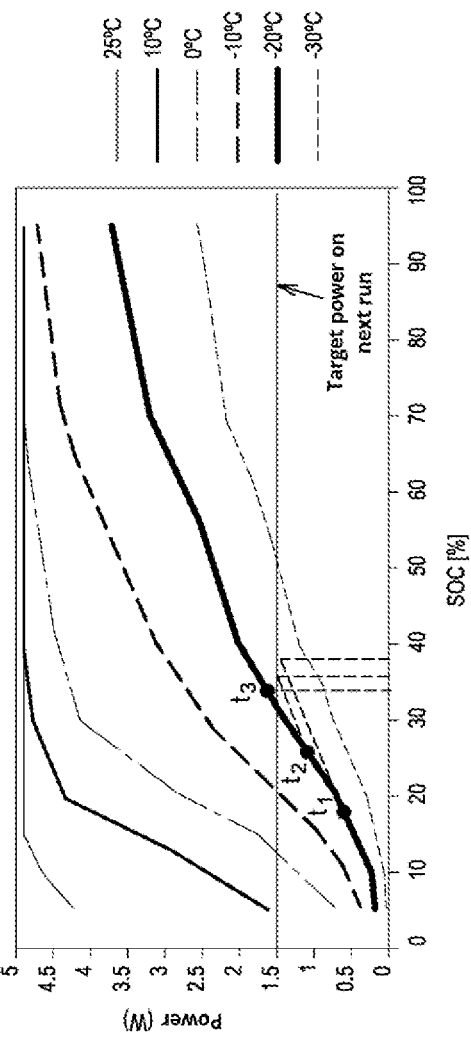

The principle is the same as that described previously for the calculation of SOC_current_target. The BMS sends the projection of the maximum available power level in the battery corresponding to the current SOC and to the future Tbat. Since the level of demand for performance on departure for the future run can be different relative to the demands of the current run, the targets of Pbat_discharge_max can therefore differ. FIG. 4 illustrates an example in which current Tamb is −15° C. (predicted Tbat=−20° C.) and target Pbat for the future run is 15 kW:
at an instant t1:
SOC=19%
Tbat on next run=−20° C.
Pbat=5 kW
SOC_future_target=37%
at an instant t2:
SOC=26%
Tbat on next run=−20° C.
Pbat=1135 kW
SOC_future_target=33%
at an instant t3:
SOC=31%
Tbat on next run=−20° C.
Pbat=15 kW
SOC_future_target=31%

As in the preceding case, it can be seen in the example of FIG. 4 that, by virtue of the local linearization and of the monotonic link between Pbat and the SOC, the target SOCs calculated cause the current SOC to rise to converge toward the SOC corresponding to target Pbat.

Estimation of the Final Target SOC

The final target SOC is the maximum between:
The target SOC calculated for the current run;
The target SOC calculated for the future run;
The minimum target SOC necessary to ensure the regulation of the SOC in "charge sustaining" mode.

The invention described previously therefore clearly has the main advantage of adjusting the battery charge level as a function of the internal and the ambient temperatures, in order to guarantee a minimum required performance level (whether it be for vehicle takeoff or for any other service provided, for both the current run and the next run.

The invention claimed is:
1. A method for managing a state of charge of a traction battery of a hybrid vehicle power train, including a heat engine and an electric engine, the method comprising, during a phase of running of the vehicle to a current destination:
predicting a temperature that the battery will reach, after the power train is switched off, at a time of departure to a future destination;
estimating, as a function of the battery temperature previously predicted, a minimum state of charge of the battery making it possible to provide, during a phase of running to the future destination, a predefined minimum power level available at terminals of the battery to ensure a minimum level of driving in electric mode;
maintaining the state of charge of the battery by controlling use of the heat engine and the electric engine such that the state of charge of the battery does not fall below the minimum state of charge during the phase of running the vehicle to the current destination,
wherein parameters of the predicting the temperature that the battery will reach include a model of variation of an ambient temperature between the end of the current run and the start of the future run, and
wherein, a location of the vehicle being known from a geolocation system and a measured minimum temperature at said location being known from a meteorological information broadcasting system, the model of variation of the ambient temperature is defined such that:
a variation of the ambient temperature is zero when a measured ambient temperature is below the measured minimum temperature;
the variation is equal to a negative constant when the measured ambient temperature is above a predefined value greater than the measured minimum temperature; and
the variation trends linearly between the measured minimum temperature and the predefined value.

2. The method as claimed in claim 1, wherein the parameters of the predicting the temperature that the battery will reach include:
an elapsed time between an end of the current run and a start of the future run, and/or
a model of thermal inertia of the battery giving a trend of the battery temperature as a function of a trend of the ambient temperature.

3. The method as claimed in claim 2, wherein the elapsed time between the end of the current run and the start of the future run is:
obtained directly from a run scheduling system, or;
deduced statistically from previous runs obtained from a run memorizing system, said previous runs exhibiting similarities with the current run, or;
equal to a constant.

4. The method as claimed in claim 2, wherein the model of thermal inertia of the battery is defined such that the battery temperature varies identically with the ambient temperature.

5. The method as claimed in claim 1, wherein the estimating the minimum state of charge includes selecting the maximum value from among a plurality of state of charge values, said plurality including at least:
a minimum state of charge value to reach the current destination, estimated as a function of a measured current temperature of the battery and;
a minimum state of charge value to reach the future destination, estimated as a function of the battery temperature previously predicted.

6. The method as claimed in claim 5, wherein the plurality of state of charge values also includes a minimum state of charge to ensure a predefined life of the battery.

7. The method as claimed in claim 5, wherein the minimum state of charge values to reach the current destination and to reach the future destination are calculated in real time by a method of linear modelling of a trend of available power in the battery as a function of the state of charge of the battery.

8. The method as claimed in claim 7, wherein the linear modelling method is a recursive least squares method.

9. The method as claimed in claim 8, wherein, on each new estimation of a state of charge value obtained recursively from the preceding estimation, said preceding estimation is multiplied by an omission factor $\lambda < 1$.

10. A non-transitory computer readable medium storing a program that, when executed by a computer, causes the computer to execute the method as claimed in claim 1.

11. A hybrid vehicle comprising the non-transitory computer readable medium as claimed in claim 10.

12. The method as claimed in claim 1, wherein parameters of the predicting the temperature that the battery will reach include:
  an elapsed time between an end of the current run and a start of the future run,
  a model of variation of an ambient temperature between the end of the current run and the start of the future run, and
  a model of thermal inertia of the battery giving a trend of the battery temperature as a function of a trend of the ambient temperature.

* * * * *